3,741,799
Patented June 26, 1973

3,741,799
METHOD OF IMPROVING PAINT ADHESION TO LOW-SHRINK POLYESTER-BASED RESINS
Willy Paul Kulhanek, Cuyahoga Falls, Ohio, assignor to The General Tire & Rubber Company
No Drawing. Filed May 10, 1971, Ser. No. 142,016
Int. Cl. B32b 25/08, 27/36
U.S. Cl. 117—138.8 F    7 Claims

ABSTRACT OF THE DISCLOSURE

Paint adhesion to cured polyester-based resins is severely deteriorated by the addition of low-shrink additives to the resin. This invention is a method of improving paint adhesion to low-shrink formulated polyester-based resins by addition to the uncured resin of certain lower alkyl ethers of formaldehyde condensates.

BACKGROUND OF THE INVENTION

This invention relates to the field of polymeric chemistry. More particularly, this invention relates to thermosetting polyester-based resins and to additives thereto that improve adhesion of certain paints.

Polyester-based resins make up a large portion of the thermosetting resin trade. Generally, they comprise the addition-type reaction product of a major amount of an unsaturated polyester and a minor amount of a crosslinkable monomer (hence the term "polyester-based"). They may contain a variety of additives and may be formulated with reinforcing fibers into sheet molding compounds (SCM), bulk molding compounds (BMC), and hand layup molding compounds, all known under the generic terms "fiber reinforced polyester" or "FRP" plastics.

Many products are made from polyester-based resins such as automobile parts, household appliance housings, hand tools, rocket nose cones, etc. Where decoration or surface finishing is required, there has been little, if any, difficulty encountered. Cured polyester-based resins are chemically inert for the most part and are receptive to most conventional paints and lacquers. Development in another area of these resins, however, has created difficulties with respect to their paintability.

A well-known problem in FRP molding is shrinkage of the mold charge during the crosslinking or polymerization reaction. The charge is heated to accelerate crosslinking and because the density-temperature coefficients of the liquid polyester and the liquid crosslinking monomer are similar to those of other liquids, the hot liquid expands and some of it escapes from the mold to later create a volumetric deficiency when the mixture cools. In addition to this thermal shrinkage, the density of the crosslinked polymer is significantly greater than the sum of the densities of the separate liquids so that additional shrinkage is brought about by the polymerization reaction. The total shrinkage from these two causes is sufficient to prevent accurate molding of many parts, especially where the part is large and must have a smooth surface. Shrinkage shows up as indentations or sink-holes on the surface of the part, usually in areas where there is an abrupt change in thickness such as at bosses and ribs.

In an effort to control this shrinkage, certain formulation changes have been made in conventional polyester-based resins. Generally, these changes comprise the addition of one or more "low-shrink" or "low profile" additives; these are usually finely divided particles of thermoplastic resins, see Australian patent application No. 24,802/67. Although these formulation changes have greatly reduced shrinkage, they have created serious problems in finishing the cured part, namely, they severely deteriorate the adhesion of paints to the surface of the cured polyester-based resin.

It is theorized that part of this deterioration is caused by the low-shrink or low-profile additives migrating to the surface during polymerization. As thermoplastic resins are known to be less polar than thermosetting resins, this migration causes the surface to become less polar and thus less receptive to bonding with paints and other finishes.

This invention is based upon the surprising discovery that addition of certain lower alkyl ethers of formaldehyde condensates to the uncured-low-shrink polyester-based resin will increase adhesion between the resin and overlying layers of certain paints, i.e. paints that are normally used on FRP surfaces. The increase in adhesion produced by this invention is at least to the degree of the same paint and in many cases to a higher degree. It is theorized that this improvement is caused by the high dipole characteristics of these compounds and by the increase in polarity on the surface of the cured resin when these compounds are polymerized therein. Moreover, these compounds do not produce an improvement in adhesion unless added to the uncured resin, i.e., where added to the primer or paint they do not improve adhesion to cured low-shrink polyester resins. This is surprising in light of United States Pat. 2,876,135 that teaches the use of compounds similar to ones of this invention in primers for improvement in adhesion between the primer and phosphate coated steel.

Therefore, the main object of this invention is a method of improving paint adhesion to cured, low-shrink polyester-based resins. Other objects include a method that does not affect other properties of the cured FRP, that is easy to perform, and that is amenable to automatic and semi-automatic process control. These and other objects will become more apparent upon reading the description of the preferred embodiment attached hereto.

SUMMARY OF THE INVENTION

This invention concerns a method of improving adhesion of certain paints to the surface of a cured low-shrink polyester-based resins comprising adding to the uncured resin a stoichiometric excess of a lower alkyl etherated formaldehyde condensate of a compound selected from the group consisting of aminotriazines and compounds having the general formula

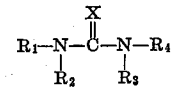

wherein $R_1$, $R_2$ and $R_3$ may be hydrogen atoms, aliphatic, alicyclic, aromatic, or carbamoyl groups, and $R_4$ may be a hydrogen atom, an aliphatic, alicyclic, aromatic, cyano, or carbamoyl group and wherein X may be an oxygen atom, a sulfur atom, or an imido group.

DESCRIPTION OF THE PREFERRED EMBODIMENT

This invention is applicable to low-shrink or low-profile polyester-based resins as that term is used in the plastics art. Polyester based resins generally are blends of unsaturated polyester resins and crosslinkable monomers. Polyesters generally are made by esterifying (condensing) polycarboxylic acids and glycols and removing water to form a viscous liquid or meltable solid containing relatively few residual hydroxyl and carboxyl groups, i.e., having a relatively low hydroxyl and acid number. Examples of polycarboxylic acids usable in the preparation of these polyester resins include dicarboxylic acids such as oxalic; malonic; succinic; glutaric; adipic; pimelic; suberic; azelaic; sebacic; fumaric; diglycolic; maleic; phthalic (anhydride); isophthalic; terephthalic; hexahydroterephthalic; tetrachlorophthalic (anhydride); chlorophthalic (anhydride); diphenic; and nitro-phthalic acid; and tricarboxylic acids such as tricarballylic acid and citric acid. Examples of glycols usable in preparing these polyester resins include ethylene glycol; propylene glycol; ethylene glycol carbonate; butane 2,3-diol; trimethylene glycol; butane 1,3-diol; 2-methyl propane 1,3-diol; 2,2-dimethyl propane 1,3-diol; 2,2-diethyl propane 1,3-diol; cis - but - 2 - ene - 1,4-diol; trans-but-2-ene-1,4-diol; tetramethylene glycol; pentamethylene glycol; hexamethylene glycol; heptamethylene glycol; octamethylene glycol; nonamethylene glycol; decamethylene glycol; undecamethylene glycol; dodecamethylene glycol; tridecamethylene glycol; tetradecamethylene glycol; octadecamethylene glycol; eicosamethylene glycol; diethylene glycol; triethylene glycol; tetraethylene glycol; etc.

Other additives may be also incorporated into the finished resin such as antioxidants, fillers, organic and inorganic colorants, lubricants, blowing agents, adhesives, odorants, modifiers, solvents, dispersing agents, wetting agents and other polymeric materials such as thermosetting resins, thermoplastic resins, and elastomers. All of these additives may be used in conjunction with the polyester-based resin compounds of this invention without detracting from the benefits derived by the use of the lower alkyl ethers of formaldehyde condensates of this invention.

Into the resultant polyester resin is blended a crosslinkable monomeric material that enters into polymerization through the use of a free-radical generating catalyst with the unsaturation (double bonds) carried over from the carboxylic acid into the polyester during the esterification reaction. The cross-linking monomer is generally a monomeric liquid containing at least one

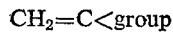

and generally characterized as a vinyl-containing monomer. These monomers may be of the aliphatic type, aromatic type, heterocyclic type, or a mixture thereof. Typical monomers usable herein include styrene, chlorostyrene, dichlorostyrene, alkyl styrene α-methyl styrene, vinyl naphthalene, diallyl phthalate, diallyl maleate, diallyl fumarate, diallyl succinate, ethyl-vinyl ether, diallyl ether, methylallyl ethyl ether, methylvinyl ketone, divinyl ketone, methyl acrylate, ethyl acrylate, methyl methacrylate, acrylonitrile, methacrylonitrile, and the like.

Examples of usable free radical generating catalysts include such materials as lauroyl peroxide, benzoyl peroxide, parachloro benzoyl peroxide, 2,4-dichlorobenzoyl peroxide, methylethyl ketone peroxide, cyclohexananone peroxide, methyl isobutyl ketone peroxide, dicumel peroxide, 2,2-bis(4,4-ditertiary butyl peroxycyclohexyl propane), tertiary butyl peracetate, tertiary butyl perbenzoate, and azo-bis-isobutrylnitrile.

These polyester-based resins are rendered low-shrink or low-profile by the addition of finely divided particles of thermoplastic resins such as polymethyl methacrylate, polypropylene, polyethylene, high-impact polystyrene, etc., in solution with a crosslinkable monomer such as styrene. This technology is explained in Australian patent application No. 24,802/67.

The method of this invention comprises adding to the uncured resin a stoichiometric excess of a lower alkyl etherated formaldehyde condensate of a compound selected from the group consisting of aminotriazines and compounds having the general formula

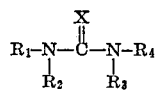

wherein $R_1$, $R_2$ and $R_3$ may be hydrogen atoms, aliphatic, alicyclic, aromatic or carbamoyl groups; and $R_4$ may be a hydrogen atom; aliphatic; alicyclic; aromatic; cyano; or carbamoyl group and wherein X may be an oxygen atom, a sulfur atom, or an imido group.

These compounds are liquids or powders at room temperature and are easily blended into the formulation along with the other additives. They may be added at any stage in the formulating—the prime requisite is that they be homogeneously blended in the polyester resin compound prior to curing. The thus formulated polyester-based resin is thereafter directly processable into a finished article, or may be mixed with various natural or synthetic fibrous materials in the form of loose fibers (bulk molding compounds) or with woven or nonwoven sheets of fibrous material (sheet molding compounds) and thereafter molded to the desired shape and heated to produce crosslinking of curing of the material.

An example of a lower alkyl etherated formaldehyde condensate of an aminotriazine is butyl ether of hexamethylol melamine. It is made by condensing melamine with formaldehyde to produce hexamethylol melamine as shown in Equation 1.

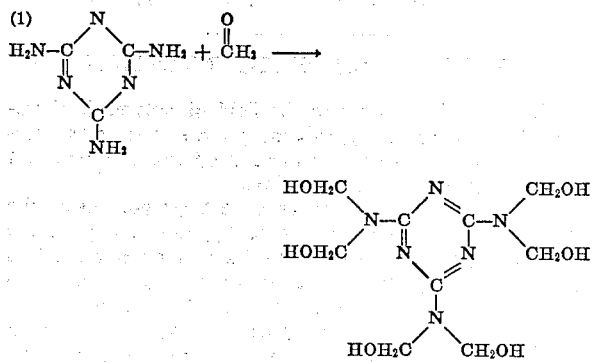

The hexamethylol melamine is then etherated with a lower alkanol such as butanol to produce the lower alkyl etherated product as shown in Equation 2.

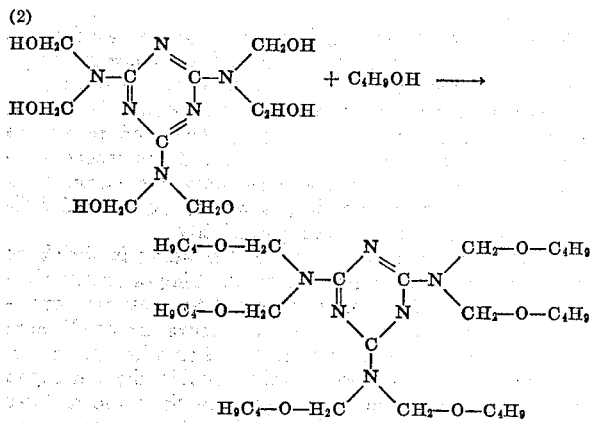

When this compound is admixed to the polyester resin and heated, the etherated methylol ($CH_2$—O—$C_4H_9$) groups undergo transetherfication with the hydroxyl groups in the polyester and crosslink into the polyester matrix as shown in Equation 3

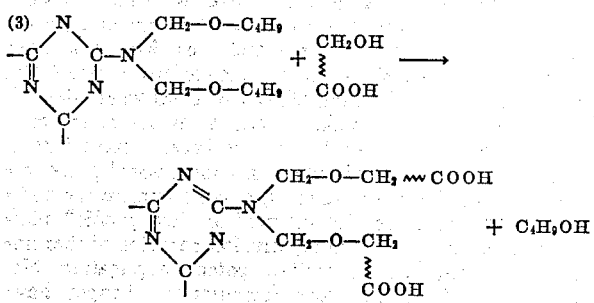

The term "lower" alkyl group means an alkyl group containing from 1 to 6 carbon atoms from a primary alcohol such as methanol, ethanol, propanol, isopropanol, butanol, etc. Because the compound is crosslinkable with the polyester by transetherfication with the hydroxyl groups therein, a stoichiometric excess of the compound is added so that there will be an excess of methylol (—$CH_2OH$) groups or etherated methylol groups remaining in the cured resin. These groups, whether crosslinked or residual, raise the surface polarity of the cured polyester resin and give rise to a higher degree of hydrogen bonding hence improved adhesion with overlying layers of paints. In some cases etherated methylol groups on the surface will react with the free hydroxyl groups in the paint to improve the bonding. In lieu of melamine, one may start with other amino triazines such as a guanamine like hexamethyl guanamine, etc.

The other group of compounds usable herein to improve paint adhesion are lower alkyl etherated formaldehyde condensates of compounds having the general formula

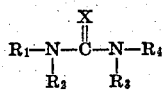

An example of these compounds is butyl ether of tetramethylol urea that is made by condensing urea with formaldehyde to produce tetramethylol urea as shown in Equation 4

(4)
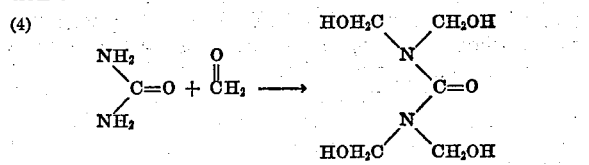

The methylol groups are then etherated with a lower alkanol as shown in Equation 5

(5)
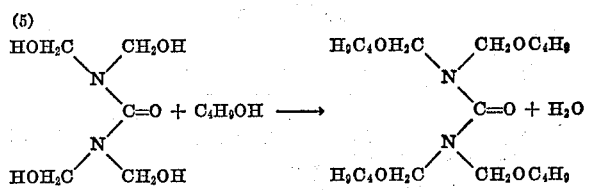

The alkyl ether of tetramethylol urea is then added in stoichiometric excess to the uncured polyester resin. Upon heating, i.e. during the polyester curing or crosslinking reaction, the alkyl ether undergoes transetherification with the hydroxyl groups in the polyester (expelling alcohol) and becomes crosslinked into the cured polyester matrix, as shown in Equation 6.

(6)
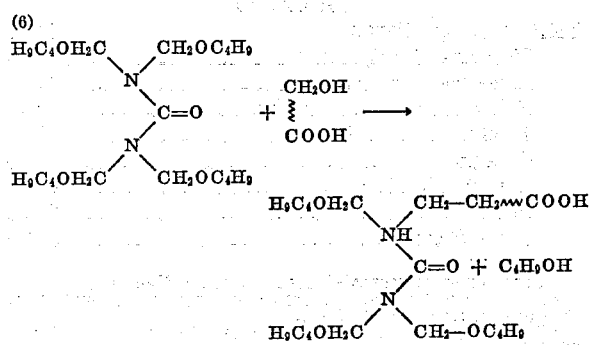

The excess primary alcohol alkylated groups

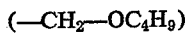

remaining from the stoichiometric excess of tetramethylol urea are now able to either react with hydroxyl containing paints applied to the surface of the cured polyester and thus form a tight (chemically linked) bond therebetween or form a high dipole moment on the surface to improve the (hydrogen) bonding to applied coats of paint.

Other compounds may be used as starting materials such as guanidine ($R_1$, $R_2$, $R_3$ and $R_4$ are hydrogen atoms and X is an imido group), thiourea ($R_1$, $R_2$, $R_3$ and $R_4$ are hydrogen atoms and X is a sulfur atom), biuret ($R_1$, $R_2$, and $R_3$ are hydrogen atoms, $R_4$ is a carbamoyl group, and X is an oxygen atom), and dicyandiamide ($R_1$, $R_2$ and $R_3$ are hydrogen atoms, $R_4$ is a cyano group, and X is an imido group.)

As stated before, a stoichiometric excess of the lower alkyl etherated compound is needed to provide unreacted (alcohol) alkylated groups in the cured polyester matrix. The stoichiometry of the equations, especially Equations 3 and 6 depends upon the hydroxyl and carboxyl numbers of the particular polyester resins used; this technology is within the ambit of one skilled in the polyester plastics art and will not be further discussed.

The addition of these compounds to the polyester does not alter the curing conditions conventional for these resins nor does it alter the physical properties of the cured resin. However, these compounds begin to adversely affect overall physical properties starting at about 20 parts (by weight) per hundred parts polyester resin. Improvement in paint adhesion is obtained at less than 20 parts, i.e. between about 2.5 to about 10 parts so there is no reason for exceeding the 20 parts level for the purposes of this invention.

After addition of these compounds of this invention, the polyester resin composition may be shaped to the desired form and cured by conventional means. For bulk molding compound (BMC) the shaping and curing is accomplished in a hot compression mold press; for sheet molding compound (SMC) and hand lay-up molding, a similar hot press is used. Other forms of curing are also usable in the appropriate circumstances such as radiation and dielectric curing.

Onto the finished or cured low-shrink polyester resin is thereafter applied coatings of primer or paint or both for the purpose of giving additional protection to the finished material, decorating the part, or a combination of these and other reasons.

The paints that may be used on the cured low-shrink polyester-based resin may be of the solvent-based type. These solvent-based coatings may either be oil-based, urethane-based, epoxy-based, or alkyd-based materials. Of the oil-based paints the most widely used are linseed oil and soybean oil that polymerize into hard, durable coatings through chemical reaction catalyzed by the oxygen in the air.

The alkyl-based coatings usable herein are formed by an esterification-condensation type reaction between a polybasic acid and a polyhydric alcohol and are either employed alone or in combination with modifying ingredients such as non-drying oils, semi-drying oils, drying oils, fatty oils, fatty acid oils, and mixtures thereof.

Examples of polybasic acids include phthalic acid, isophthalic acid; terephthalic acid; tetrachlorophthalic acid; maleic acid, dodecylmaleic acid; octadecenylmaleic acid; fumaric acid; aconitic acid, itaconic acid, trimellitic acid; tricarballylic acid; 3,3'-thio-dipropionc acid; 4,4'-sulfonyldihexanoic acid; 3-octene-dioic-1,7 acid; 3-methyl-3-decendioic acid; succinic acid; adipic acid; 1,4-cyclohexadiene-1,2-dicarboxylic acid; 3-methyl-3,5-cyclohexadiene-1,2-dicarboxylic acid; 8,12-eicosadienedioic acid; 8-vinyl-10-octadecenedioic acid; and the corresponding acid anhydrides, acid chlorides, and acid esters such as phthalic anhydride, phthaloyl chloride, and the dimethyl ester of phthalic acid.

Examples of polyhydric alcohols usable herein include glycerol; polyglycerol; pentaerythritol; polypentaerythritol; mannitol; trimethylolpropane; sorbitol; methyltrimethylolmethane; 1,4,6-octanetriol; bentanediol; pentanediol; hexanediol; dodecanediol; octanediol; chloropentanediol; glycerol monallyl ether; glycerol monoethyl ether; triethylene glycol; 3-ethylhexanediol-1,4; 3,3'-thiodipropanol; 4,4'-sulfonyl-dihexanol; cyclohexanediol-1,4; 1,2,6-hexanetriol; 1,3,5-hexanetriol; polyallyl alcohol; 1,3-bis-(2-hydroxyethoxy) propane; 5,5'-dihydroxydiamyl ether; tetrahydrofuran - 2,5 - dipropanol; tetrahydrofuran-2,5-dipentanol; 2,5-dihydroxytetrahydrofuran; tetrahydrothiophene-2,5-dipropanol; tetrahydropyrrole-2,5-propanol; 4,-hydroxy-3,3 hydroxytetrahydropyran; 2,5-dihydroxy-3,4-dihydro-1,2-pyran; 4,4'-sulfinyldipropanol; 2,2-bis (4-hydroxyphenyl)-propane; 2,2'-bis (4-hydroxyphenyl) methane, and the like.

Examples of modifying oils that may be combined with the aforementioned alkyds include linseed oil, rapeseed oil, cottonseed oil, chinawood oil, castor oil (including raw castor oil and dehydrated castor oil), soyabean oil, perilla oil, oiticia oil, linseed oil acids, coconut oil fatty acids, ricinoleic acid, fatty acid glycerides, e.g. the glycerides of linoleic and linolenic acids, palmitic acid, oleic acid, stearic acid, fish oils, fish oil acids, etc. The amount of modifying oil may be varied widely and may range from about 5% to 70%, preferably from about 10% to 15% by weight of the total weight of the modifying oil, the polyhydric alcohol, the polybasic acids (or anhydride if it is used) present in the reaction mixture designed to make the alkyd resin.

Epoxy-based coatings generally comprise condensation products of epichlorohydrin and bisphenol A with pigments, carriers, solvents, thickeners, and modifiers. Generally speaking, epoxy-based coatings may be of three types: (1) 100 percent solids coatings, (2) nonesterified solution coatings, and (3) esterified solution coatings. The 100 percent solids coatings are low-viscosity liquid epoxy resins that serve as vehicle and wetting agent for the colorants, fillers, flow control agents, and other additives. The nonesterified solution coatings involve the use of high molecular weight (1000 M.W. or more) epoxy resins having a degree of polymerization between $n=3$ and $n=12$ (for greater flexibility), oxygenated solvents such as ketones, esters, and ethers, and resinous curing agents such as phenolics, polyamides, melamines, polysulfides, and acids. The esterified solution coatings include epoxy resins modified with unsaturated fatty acids such as tall oil, linseed oil, cocoanut fatty acid, etc.

Urethane-based coatings are generally comprised of reactive combinations of polyhydroxy materials and disisocyanate-bearing materials. They are many and varied; one well-known coating is the reactive product of a diisocyanate with castor oil that is cured with lead and cobalt driers. Other types include moisture curable formulations, heat curable formulations, prepolymer-amine formulations and polyisocyanate-polyol (two package) formulations.

In addition to the alkyd-based, epoxy-based and urethane-based paints described above, other paints may be used such as lacquers, varnishes, and other polymeric type coatings; examples of these include ethyl cellulose, nitrocellulose, cellulose acetate, cellulose acetobutyrate, vinylidene chloride, polyvinyl chloride, styrene-acrylonitrile, and others such as acrylates, methacrylates, etc. Still other paints such as oil-modified phenolic resins and oil-modified phenol-formaldehyde resins, urea-formaldehyde resins, melamine-formaldehyde resins, and aniline-formaldehyde resins are also usable and fully contemplated in this invention.

The paint may be applied in a variety of ways such as by a paint brush, spraying, dipping, roll coating, electrostatic spraying, photolithographing, rotogravure printing, silk screening, etc. As the benefits accruing from the addition of these etherated formaldehyde condensates is primarily the increased paint adhesion, the method of applying the paint to the polyester resin surface is of no particular importance as long as the proper coating and the proper thickness is applied to the surface.

Following are examples given to show one skilled in the art an indication of how to practice the invention as well as to indicate some of the beneficial aspects thereof; namely, the increased adhesion of the paint to the finished low-shrink polyester-based resin surface. Unless otherwise noted, all parts are in parts by weight per 100 parts of polyester resin. The examples show the results of an adhesion test; this test is performed by scratching ten parallel lines 0.05 inch apart on the surface of the painted polyester resin surface. At an angle of about 90° from these lines another set of ten parallel lines 0.05 inch apart are scratched with the same knife so as to cross the original lines. Then a third set of ten parallel lines 0.05 inch apart are scratched at an angle of 135° with the original set of lines. Thereafter, a piece of masking tape is pressed onto the scratched surface so that the adhesive portion is against the painted surface. The tape is pressed into full adherence with the painted surface and then is quickly stripped away. A passing paint adhesion test is indicated by the lack of paint removed from the area of the scratches; whereas, a failing adhesion test is indicated by pieces of paint from the scratched area remaining on the adhesive of the masking tape. Such a test is widely recognized in the plastics art and widely used especially in the automotive industry.

EXAMPLE 1

A paint primer was prepared by mechanically blending the ingredients shown below in Table 1a. The primer was then applied in a thin, i.e. 2–5 mil. coating over various substrates, namely, a phosphated steel panel, an untreated steel panel, and a cured low-shrink polyester-based FRP panel (formula in Table 1b). The panels were dried for about 3 minutes then baked for about 45 minutes at 275° F. The above-described adhesion test was then performed on each panel, the results of which are shown below in Table 1c.

TABLE 1a

| Primer ingredients: | Parts |
| --- | --- |
| Carbon black | 3.32 |
| Zinc chromate | 3.32 |
| Talc | 3.32 |
| Alkyd resin solids (acid number 35) | 14.44 |
| Urea-formaldehyde resin (Uformite F–240)[1] | 1.17 |
| Vinyl resin solids (VAGH)[2] | 3.90 |
| Propylene oxide | 0.30 |
| Mixed naphthenic solvents | 18.81 |
| Ethyl amyl ketone | 6.04 |
| Isopropanol | 5.20 |
| Hexone | 40.08 |

TABLE 1b

| FRP panel ingredients: | Parts |
| --- | --- |
| Unsaturated polyester [3] | 100.00 |
| Low-shrink additive [4] | 25.00 |
| Polymerization inhibitor [5] | 0.53 |
| Thickening agent [6] | 0.25 |
| Catalyst [7] | 5.00 |
| Low-shrink additives [8] | 15.00 |
| Filler [9] | 250.00 |
| Glass fibers [10] | 25.00 |

[1] Butyl ether of methylol urea—Rohm & Haas Co.
[2] Partially hydrolyzed copolymer of vinyl acetate and vinyl chloride—Union Carbide Corp.
[3] Styrenated isophthalic fumarate—Selectron® 50204—PPG Industries.
[4] 35% solution of high impact grade polystyrene in styrene monomer.
[5] Ditertiary butyl cresol—Ionol®—Shell Chemical Co. Grace Co.
[6] Magnesium oxide in mineral oil—Modifier M—W. R.
[7] p-Tertiary butyl peroctoate—Lupersol® PDO—Lucidol Corp.
[8] Finely divided polyethylene—Microthene® F510—U.S.I. Corp.
[9] Coated calcium carbonate—Surfex® MM—Diamond Shamrock Corp.
[10] ¼ inch glass fibers—Type 832—Owens Corning Fiberglass Co.

TABLE 1c

| | Adhesion test—9 locations on each panel | |
|---|---|---|
| | Passed | Failed |
| Phosphated steel panel | 9 | 0 |
| Untreated steel panel | 2 | 7 |
| Cured FRP panel | 0 | 9 |

This example demonstrates that the components of this invention are not operative when added to the paint that is coated over the cured low-shrink polyester-based resin surface.

EXAMPLE 2

Low-shrink formulated polyester-based resins were prepared according to the receipe shown below in Table 2a. The ingredients were added in the order shown and mechanically mixed until a smooth paste was formed. The resins were pressed into smooth ⅛ inch thick sheets and cured under 200 p.s.i. gauge pressure for 4 minutes at 275° F. and then 10 minutes at 350° F. The surface of each panel was then coated with a heat curable epoxy-alkyd paint (828–2108 E. I. du Pont de Nemours & Co., Inc.) and cured for 30 minutes at 325° F. Adhesion and other tests were conducted on the finished panels; the results are shown below in Table 2b.

resins does not adversely affect other properties of the cured resin.

What is claimed is:

1. A method for improving the adhesion of epoxy-based, urethane-based, or alkyd-based paints to the surface of a cured low-shrink polyester-based resin which comprises (I) adding to a non-aqueous composition comprising:
   (1) an ethylenically unsaturated cross-linkable polyester resin of the condensation of a polycarboxylic acid and a glycol,
   (2) an etthylenically unsaturated monomeric material polymerizable with said polyester resin,
   (3) finely divided particles of low-shrink thermoplastic resin, and
   (4) a free-radical generating catalyst, a stoichiometric excess of a lower alkyl etherated formaldehyde condensate of a compound selected from the group consisting of aminotriazines and compounds having the general formula

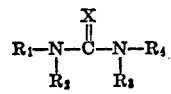

wherein $R_1$, $R_2$ and $R_3$ may be hydrogen atoms, aliphatic, alicyclic, aromatic, or carbamoyl groups, and $R_4$ may be a hydrogen atom, an aliphatic, alicyclic, aromatic, TABLE 2a

| | Parts | | | | | | | | | | |
|---|---|---|---|---|---|---|---|---|---|---|---|
| Panel ingredients | A | B | C | D | E | F | G | H | I | J | K |
| Unsaturated polyester [1] | 100.00 | 100.00 | 100.00 | 100.00 | 100.00 | 100.00 | 100.00 | 100.00 | 100.00 | 100.00 | 100.00 |
| Low shrink additive [2] | 25.00 | 25.00 | 25.00 | 25.00 | 25.00 | 25.00 | 25.00 | 25.00 | 25.00 | 25.00 | 25.00 |
| Polymerization inhibitor [3] | 0.53 | 0.53 | 0.53 | 0.53 | 0.53 | 0.53 | 0.53 | 0.53 | 0.53 | 0.53 | 0.53 |
| Thickening agent [4] | 0.25 | 0.25 | 0.25 | 0.25 | 0.25 | 0.25 | 0.25 | 0.25 | 0.25 | 0.25 | 0.25 |
| Catalyst [5] | 5.00 | 5.00 | 5.00 | 5.00 | 5.00 | 5.00 | 5.00 | 5.00 | 5.00 | 5.00 | 5.00 |
| Low shrink additive [6] | 15.00 | 15.00 | 15.00 | 15.00 | 15.00 | 15.00 | 15.00 | 15.00 | 15.00 | 15.00 | 15.00 |
| Filter [7] | 250.00 | 250.00 | 250.00 | 250.00 | 250.00 | 250.00 | 250.00 | 250.00 | 250.00 | 250.00 | 250.00 |
| Glass fibers [8] | 25.00 | 25.00 | 25.00 | 25.00 | 25.00 | 25.00 | 25.00 | 25.00 | 25.00 | 25.00 | 25.00 |
| Methyl ether of hexamethylol amine | 1.25 | | | | | | | | | | |
| Do | | 2.50 | | | | | | | | | |
| Do | | | 5.00 | | | | | | | | |
| Do | | | | 10.00 | | | | | | | |
| Butyl ether of methylol melamine | | | | | 2.50 | | | | | | |
| Do | | | | | | 5.00 | | | | | |
| Do | | | | | | | 10.00 | | | | |
| Butyl ether of tetramethylol urea | | | | | | | | 2.50 | | | |
| Do | | | | | | | | | 5.00 | | |
| Do | | | | | | | | | | 10.00 | |

[1] Styrenated isophthalic fumarate—Selectron® 5024—PPG Industries.
[2] 35% solution of high impact grade polystyrene in styrene monomer.
[3] Ditertiary butyl cresol—Ionol®—Shell Chemical Co.
[4] Magnesium oxide in mineral oil—Modifier M—W. R. Grace Co.
[5] p-Tertiary butyl peroctoate—Lupersol® PDO—Lucidol Corp.
[6] Finely divided polyethylene—Microthene® FS10—U.S.I. Corp.
[7] Coated calcium carbonate—Surfex® MM—Diamond Shamrock Corp.
[8] ¼ inch glass fibers—Type 832—Owens Corning Fiberglass Co.

TABLE 2b

| | Adhesion test—9 locations on on each panel | | Hardness "R" Rockwell | Izod notched impact strength, ft.-lb. |
|---|---|---|---|---|
| | Passed | Failed | | |
| A | 7 | 2 | 108 | 3.90 |
| B | 5 | 4 | 97 | 3.39 |
| C | 2 | 7 | 107 | 3.74 |
| D | 9 | 0 | 107 | 4.00 |
| E | 5 | 4 | 107 | 3.51 |
| F | 1 | 8 | 109 | 4.67 |
| G | 9 | 0 | | |
| H | 6 | 3 | 108 | 4.67 |
| I | 2 | 7 | 108 | 4.23 |
| J | 8 | 1 | 106 | 4.96 |
| K | 0 | 9 | 108 | 4.83 |

This example shows the wide range of alkyl ethers of formaldehyde condensates of urea and melamine compounds that improve the adhesion of paints to the surface of cured polyester-based resins. In addition, this example shows that the use of these compounds in the cyano or carbamoyl group, and wherein X may be an oxygen atom, a sulfur atom, or an imido group, (II) curing the polyester-condensate mixture and applying an epoxy-based, urethane-based or alkyl-based paint to the surface of the cured low-shrink polyester-based resin.

2. The method of claim 1 wherein said condensate is added in an amount of from about 2.5 to about 10 parts by weight per 100 parts by weight of said polyester resin.

3. The method of claim 1 wherein said condensate is a lower alkyl ether of a methylol urea.

4. The method of claim 1 wherein said condensate is a lower alkyl ether of a methylol melamine.

5. The method of claim 1 wherein said condensate is the butyl ether of tetramethylol urea.

6. The method of claim 1 wherein said condensate is the methyl ether of hexamethylol melamine.

7. The method of claim 1 wherein said condensate is the butyl ether of methylol melamine.

(References on following page)

References Cited

UNITED STATES PATENTS

| | | | |
|---|---|---|---|
| 2,680,104 | 6/1954 | Cordier | 260—850 X |
| 3,030,234 | 4/1962 | McClinton | 117—138.8 |
| 2,876,135 | 3/1959 | Levine | 260—850 X |
| 2,481,155 | 9/1949 | Schaefer | 260—850 X |
| 3,338,743 | 8/1967 | Laganis | 260—850 X |
| 3,532,768 | 10/1970 | Dalibor et al. | 260—850 X |
| 3,383,342 | 5/1968 | Stephens | 260—850 X |
| 2,986,541 | 5/1961 | Zuppinger et al. | 260—850 X |
| 3,502,573 | 3/1970 | Yurcheshen et al. | 260—850 X |

FOREIGN PATENTS

| | | | |
|---|---|---|---|
| 202,863 | 9/1956 | Australia | 260—850 |
| 815,179 | 6/1959 | Great Britain | 260—850 |
| 533,997 | 2/1941 | Great Britain | 260—850 |

WILLIAM D. MARTIN, Primary Examiner

S. L. CHILDS, Assistant Examiner

U.S. Cl. X. R.

117—161 K, 161 KP, 161 ZB; 260—850, 851, 854, 856

PO-1050
(5/69)

UNITED STATES PATENT OFFICE
CERTIFICATE OF CORRECTION

Patent No. 3,741,799                    Dated June 26, 1973

Inventor(s) Willy Paul Kulhanek

It is certified that error appears in the above-identified patent and that said Letters Patent are hereby corrected as shown below:

Column 1, line 33, which reads: "(SCM)" should read ---(SMC)---.

Col. 2, lines 15 and 16, which reads: "of the same paint" should read ---of conventionally formulated polyester-based resins with the same paint---.

Column 2, line 36, which reads: "description of the preferred embodiment" should read ---Description of the Preferred Embodiment---.

Column 4, lines 21-25, which reads: (Equation 1, Part 1)

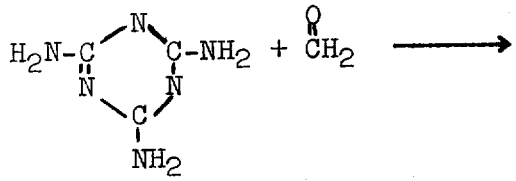

should read    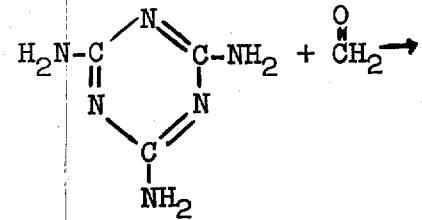

Page 2

PO-1050
(5/69)

UNITED STATES PATENT OFFICE
CERTIFICATE OF CORRECTION

Patent No. 3,741,799         Dated   June 26, 1973

Inventor(s)   Willy Paul Kulhanek

It is certified that error appears in the above-identified patent and that said Letters Patent are hereby corrected as shown below:

Column 4, line 40, which reads: (Equation 2, Part 1)

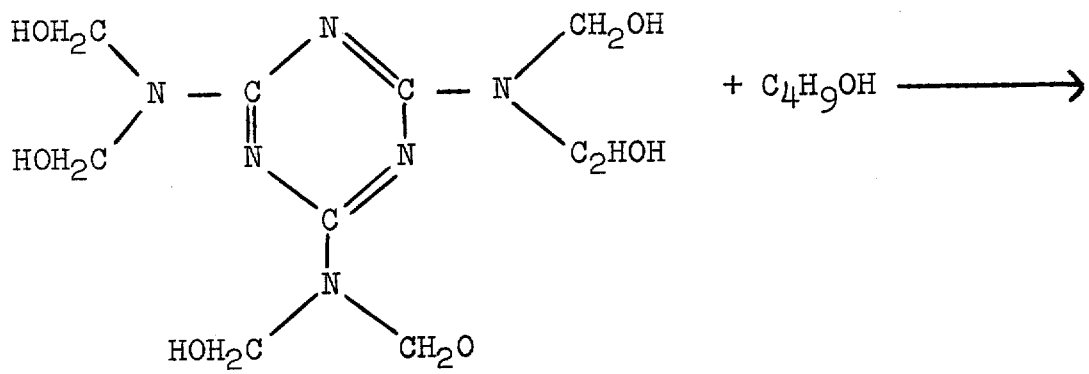

should read ---

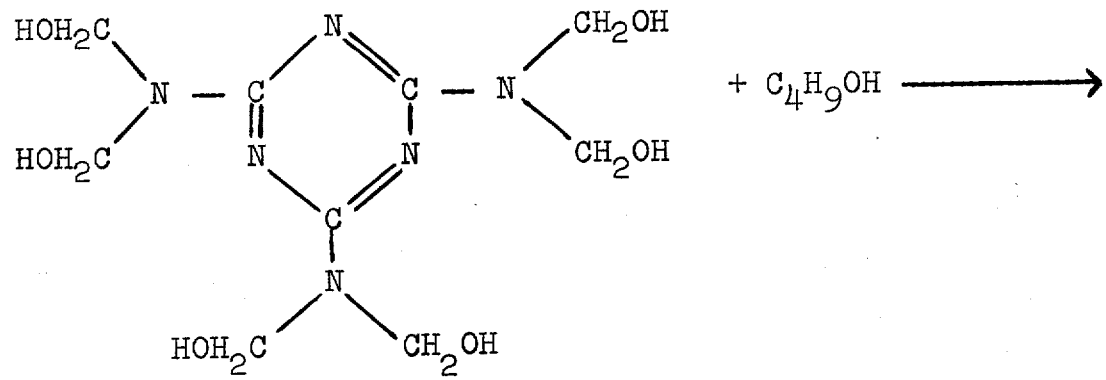

PO-1050
(5/69)

UNITED STATES PATENT OFFICE
CERTIFICATE OF CORRECTION

Patent No. 3,741,799           Dated   June 26, 1973

Inventor(s)   Willy Paul Kulhanek

It is certified that error appears in the above-identified patent and that said Letters Patent are hereby corrected as shown below:

Column 4, lines 50-55, which reads:   (Equation 2, Part 2)

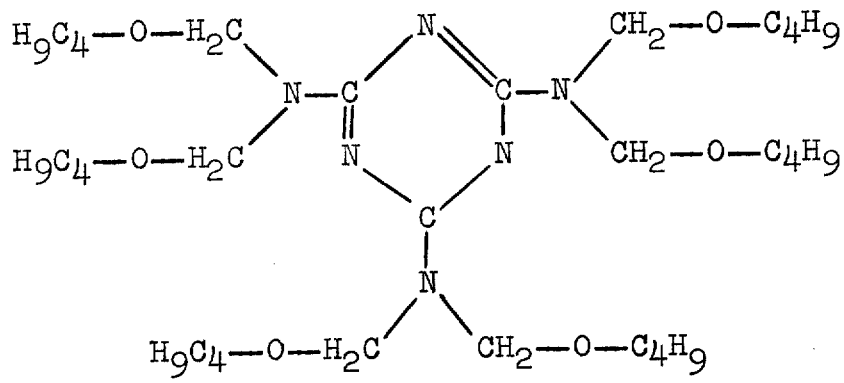

should read ---

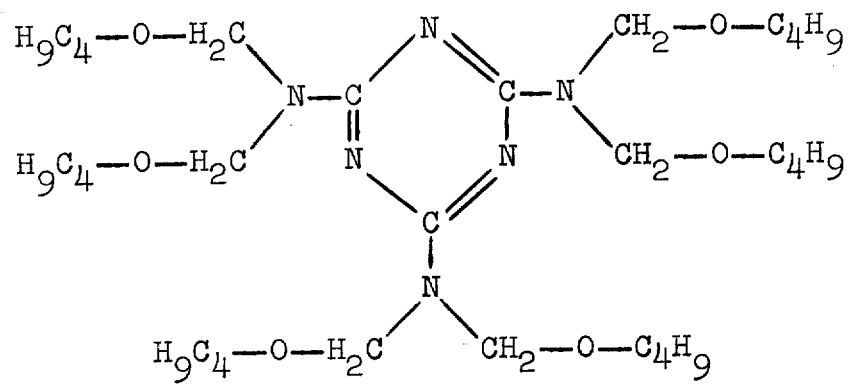

Page 4

PO-1050
(5/69)

UNITED STATES PATENT OFFICE
CERTIFICATE OF CORRECTION

Patent No. 3,741,799    Dated June 26, 1973

Inventor(s) Willy Paul Kulhanek

It is certified that error appears in the above-identified patent and that said Letters Patent are hereby corrected as shown below:

Column 4, lines 61-74, which reads:    (Equation 3, Parts 1 & 2)

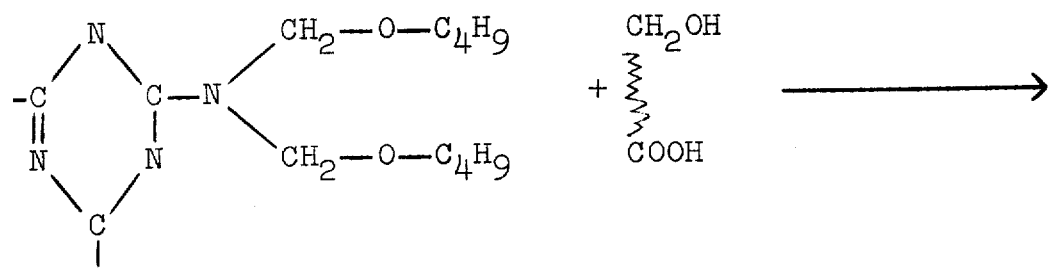

should read ---

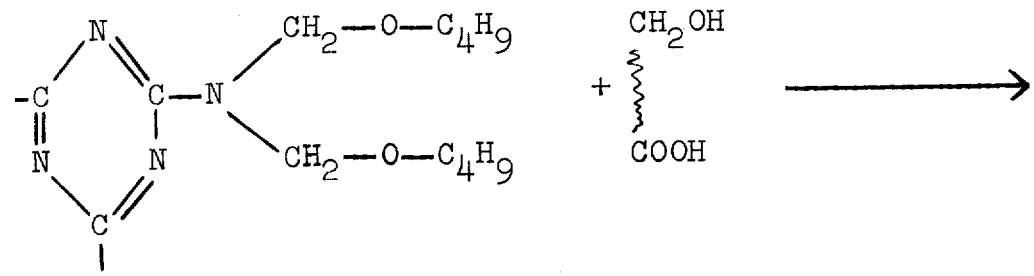

Page 5

PO-1050
(5/69)

UNITED STATES PATENT OFFICE
CERTIFICATE OF CORRECTION

Patent No. 3,741,799                    Dated June 26, 1973

Inventor(s) Willy Paul Kulhanek

It is certified that error appears in the above-identified patent and that said Letters Patent are hereby corrected as shown below:

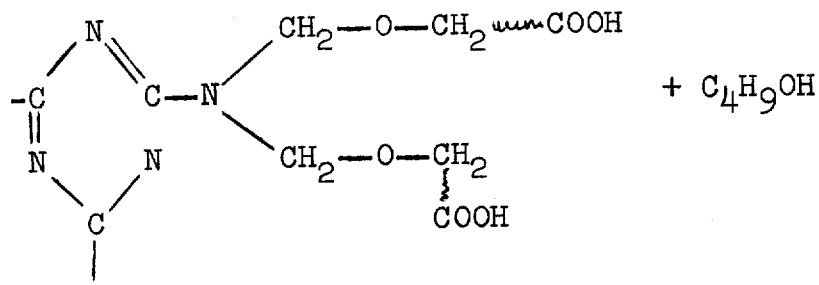

should read ---

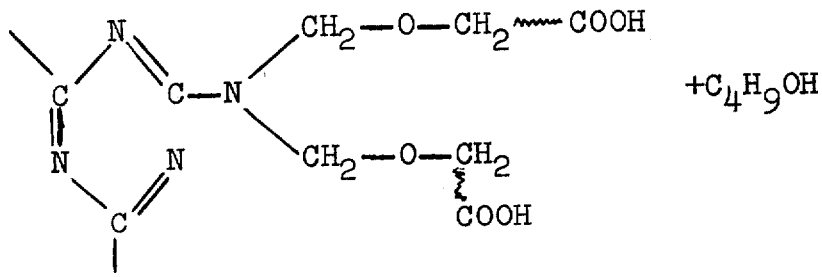

Column 8, lines 68-70, should read:
---[5]Ditertiary butyl cresol——Ionol®——Shell Chemical Co. [6]Magnesium oxide in mineral oil——Modifier M——W. R. Grace Co.

PO-1050
(5/69)

UNITED STATES PATENT OFFICE
CERTIFICATE OF CORRECTION

Patent No. 3,741,799             Dated    June 26, 1973

Inventor(s)   Willy Paul Kulhanek

It is certified that error appears in the above-identified patent and that said Letters Patent are hereby corrected as shown below:

Table 2a, which reads: "Panel ingredients" should read ---Panel Ingredients---.

Table 2a, 2nd & 6th ingredients, should read ---Low-shrink additive---.

Table 2a, Under Column A, 9th ingredient, should read ---1.25---.

Table 2a, 6th footnote, should read ---Finely divided---.

Table 2b, Headings should read ---

Adhesion Test - 9     Izod Notched
    locations on each     Impact
    panel                 Strength ft.-lb.       ---.

Column 10, line 12, which reads: "etthylenically" should read ---ethylenically---.

Signed and sealed this 22nd day of January 1974.

(SEAL)
Attest:

EDWARD M. FLETCHER, JR.          RENE D. TEGTMEYER
Attesting Officer                Acting Commissioner of Patents